US010707605B2

(12) United States Patent
Kloss

(10) Patent No.: US 10,707,605 B2
(45) Date of Patent: Jul. 7, 2020

(54) BAYONET CONNECTOR

(71) Applicant: HAES, LLC, Atlanta, GA (US)

(72) Inventor: Troy Alan Kloss, Lawrenceville, GA (US)

(73) Assignee: HAES, LLC, Atlanta, GA (US)

( * ) Notice: Subject to any disclaimer, the term of this patent is extended or adjusted under 35 U.S.C. 154(b) by 0 days.

(21) Appl. No.: 16/042,501

(22) Filed: Jul. 23, 2018

(65) Prior Publication Data

US 2019/0067858 A1 Feb. 28, 2019

Related U.S. Application Data

(60) Provisional application No. 62/549,100, filed on Aug. 23, 2017.

(51) Int. Cl.

| | |
|---|---|
| ***H01R 13/24*** | (2006.01) |
| ***H01R 13/625*** | (2006.01) |
| ***H01R 13/03*** | (2006.01) |
| ***H01R 13/652*** | (2006.01) |
| ***H01R 4/48*** | (2006.01) |
| ***H01R 13/52*** | (2006.01) |
| ***H01R 4/50*** | (2006.01) |

(Continued)

(52) U.S. Cl.

CPC .......... *H01R 13/2414* (2013.01); *H01R 4/48* (2013.01); *H01R 4/50* (2013.01); *H01R 13/03* (2013.01); *H01R 13/5202* (2013.01); *H01R 13/5219* (2013.01); *H01R 13/625* (2013.01); *H01R 13/652* (2013.01); *H01R 13/5216* (2013.01); *H01R 24/005* (2013.01); *H01R 24/86* (2013.01)

(58) Field of Classification Search

CPC ........... H01R 13/5202; H01R 13/5205; H01R 13/5219

USPC .................................................. 439/271, 275

See application file for complete search history.

(56) References Cited

U.S. PATENT DOCUMENTS

| | | | |
|---|---|---|---|
| 4,445,743 | A | 5/1984 | Bakker |
| 4,614,443 | A | 9/1986 | Hamert |
| 4,702,537 | A | 10/1987 | Mattingly et al. |

(Continued)

FOREIGN PATENT DOCUMENTS

| | | |
|---|---|---|
| CN | 201303135 | 9/2009 |
| EP | 2989686 | 3/2016 |
| WO | 2014172795 | 10/2014 |

*Primary Examiner* — Hien D Vu

(74) *Attorney, Agent, or Firm* — Meunier Carlin & Curfman LLC

(57) ABSTRACT

An electrical connector has a first connector housing with a first engagement head that includes a flange and an outside surface with an annular groove thereon. A first gasket is sized to fit around the outside surface of the first engagement head and abut with the flange. A second gasket is sized to fit within the annular groove of the first engagement head. A second connector housing with a second engagement head that includes a front face and an interior surface sized to fit around the outside surface of the first engagement head. The first connector housing and the second connector housing connect together such that the front face of the second engagement head compresses the first gasket against the flange of the first engagement head and forms a first seal. The second gasket forms a second seal between the outside surface of the first engagement head and the interior surface of the second engagement head.

19 Claims, 4 Drawing Sheets

(51) Int. Cl.
*H01R 24/86* (2011.01)
*H01R 24/00* (2011.01)

(56) References Cited

U.S. PATENT DOCUMENTS

| | | | | | |
|---|---|---|---|---|---|
| 4,702,710 | A * | 10/1987 | Dittman | H01R 13/5205 | 439/125 |
| 4,796,615 | A | 1/1989 | Bullock et al. | | |
| 4,832,615 | A * | 5/1989 | Thakrar | H01R 13/5219 | 439/272 |
| 5,104,340 | A * | 4/1992 | Elam | H01R 13/533 | 439/604 |
| 6,561,841 | B2 * | 5/2003 | Norwood | H01R 13/625 | 439/286 |
| 6,623,289 | B2 | 9/2003 | Decicco | | |
| 6,955,562 | B1 * | 10/2005 | Henningsen | H01R 9/0521 | 439/578 |
| 7,040,909 | B2 * | 5/2006 | Cairns | G02B 6/3816 | 439/271 |
| 7,322,859 | B2 | 1/2008 | Evans | | |
| 7,331,820 | B2 * | 2/2008 | Burris | H01R 9/05 | 439/275 |
| 8,398,420 | B2 * | 3/2013 | Watson | E21B 17/025 | 439/275 |
| 8,574,007 | B2 | 11/2013 | Smith et al. | | |
| 8,636,549 | B2 | 1/2014 | Pratt et al. | | |
| 8,702,439 | B1 * | 4/2014 | Paulsel | H01R 13/5216 | 439/271 |
| 9,028,273 | B2 | 5/2015 | Smith et al. | | |
| 9,088,109 | B2 | 7/2015 | Little et al. | | |
| 9,477,049 | B2 | 10/2016 | Gniadek et al. | | |
| 9,752,682 | B2 * | 9/2017 | Winkelmann | F16J 15/166 | |
| 2004/0087198 | A1 | 5/2004 | Decicco | | |
| 2013/0187380 | A1 * | 7/2013 | Leggett | F16L 21/03 | 285/351 |
| 2016/0305574 | A1 * | 10/2016 | Burdge | A61M 39/1011 | |

* cited by examiner

BAYONET CONNECTOR

BACKGROUND

The use of quick release electrical couplers or connectors to mate electrical conductors to other conductors or to diagnostic or other equipment is common. Generally, electrical connectors can include a male pin assembly having conducting pins and a female socket assembly having conducting sockets. The male pin assembly can be attached to the female socket assembly with the conducting pins being inserted into the conducting sockets. A locking assembly is also often provided for releasably locking the male pin assembly and female socket assemblies together with the pins and sockets electrically coupled.

In harsh and/or corrosive environments, such as those often encountered in a nuclear generating station, electrical connectors may be exposed to high doses of radiation, vibration, heat, and moisture, including super-heated steam and corrosive chemicals. A connection point between the male pin assembly and female socket assembly can be impacted by exposure to the environmental conditions due to penetration of the environment into the electrical connector. The connection point may also be impacted by the surrounding environment after opening the connector, for example to attach the male pin assembly or female socket assembly to diagnostic equipment. The exposure of the connection point to the environment can interrupt, obstruct, and/or degrade the electrical signal transferred between the electrical conductors.

SUMMARY

Aspects of the disclosure provide an electrical connector, comprising a first connector housing and a second connector housing. The first connector housing comprises a first engagement head. The first engagement head includes a flange and an outside surface with an annular groove thereon. The electrical connector also comprises a first gasket sized to fit around the outside surface of the first engagement head and abut with the flange. The electrical connector also comprises a second gasket sized to fit within the annular groove of the first engagement head. The second connector housing comprises a second engagement head. The second engagement head includes a front face and an interior surface sized to fit around the outside surface of the first engagement head.

In some aspects of the disclosure, the first connector housing and the second connector housing are configured to connect together such that the front face of the second engagement head compresses and the first gasket against the flange of the first engagement head to form a first seal.

In some aspects of the disclosure, the first connector housing and the second connector housing are configured to connect together such that second gasket forms a second seal between the outside surface of the first engagement head and the interior surface of the second engagement head.

In some aspects of the disclosure, the second engagement head includes an outside surface with a plurality of cams cut therein.

In some aspects of the disclosure, the first connector housing further comprises a locking ring with an interior surface and a plurality of pins protruding from the interior surface.

In some aspects of the disclosure, each of the plurality of cams is sized to receive a corresponding one of the plurality of pins.

In some aspects of the disclosure, the plurality of cams each comprise an angled surface.

In some aspects of the disclosure, the locking ring is configured to rotate about the first connector housing.

In some aspects of the disclosure, the first connector housing and the second connector housing are configured to connect together such that as the locking ring is rotated, the plurality of pins follow the plurality of cams such that the angle surface causes the second connector housing to be drawn toward the first connector housing.

In some aspects of the disclosure, the locking ring comprises an outside irregular surface of a repeating pattern of a plane followed by a concave curve.

In some aspects of the disclosure, the first connector housing also includes a spring positioned between the locking ring and the flange.

In some aspects of the disclosure, the second connector housing is a male connector housing with one or more connector pins.

In some aspects of the disclosure, the second connector housing further comprises a pin insulator.

In some aspects of the disclosure, the first connector housing is a female connector with one or more sockets configured to receive the one or more connector pins for electrical communication therebetween.

In some aspects of the disclosure, the first connector housing further comprises a socket insulator.

These and other features will be more clearly understood from the following detailed description taken in conjunction with the accompanying drawings and claims. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are provided below, the disclosed systems and methods may be implemented using any number of techniques, whether currently known or in existence. The disclosure should in no way be limited to the illustrative implementations, drawings, and techniques provided below, but may be modified within the scope of the appended claims along with their full scope of equivalents.

An electrical connector has a first connector housing with a first engagement head that includes a flange and an outside surface with an annular groove thereon. A first gasket is sized to fit around the outside surface of the first engagement head and abut with the flange. A second gasket is sized to fit within the annular groove of the first engagement head. A second connector housing with a second engagement head that includes a front face and an interior surface sized to fit around the outside surface of the first engagement head. The first connector housing and the second connector housing connect together such that the front face of the second engagement head compresses the first gasket against the flange of the first engagement head and forms a first seal. The second gasket forms a second seal between the outside surface of the first engagement head and the interior surface of the second engagement head.

The dual seal design of the electrical connector is comprised of differing materials and applications to protect the electrical connection from ingress of water, heat, radiation, and super-heated steam. The first gasket is compressed by a spring allowing for constant pressure on the first gasket even as the gasket takes a set from the compression. The second gasket takes less compression set and is contained within the annular groove and controlled by stationary surfaces. The connector is also fitted with a specialized locking ring designed to facilitate ease of use in hash environments. The ring's grip is designed to not only provide adequate purchase with gloved or bare hands, but in extreme conditions can also be used with a wrench. The cutouts in the ring allow for positive lockup of a standard adjustable wrench without the concern of crushing or damaging the connector itself; therefore, technicians can use common tools and spend as little time as necessary in hazardous environments.

Figure 1:
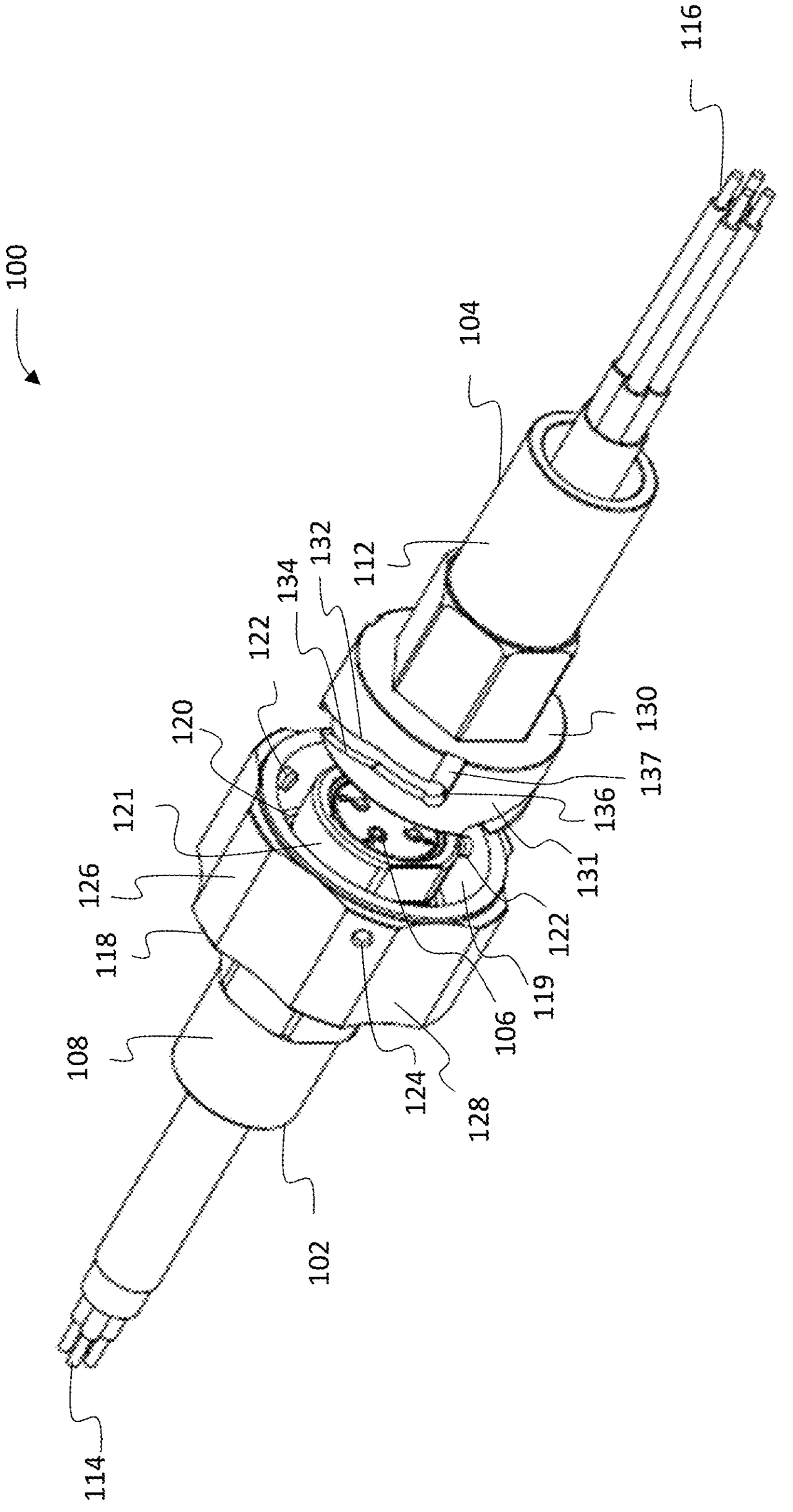
FIG. 1 shows an exemplary electrical connector suitable for implementing various embodiments of the disclosure.
Figure 2:
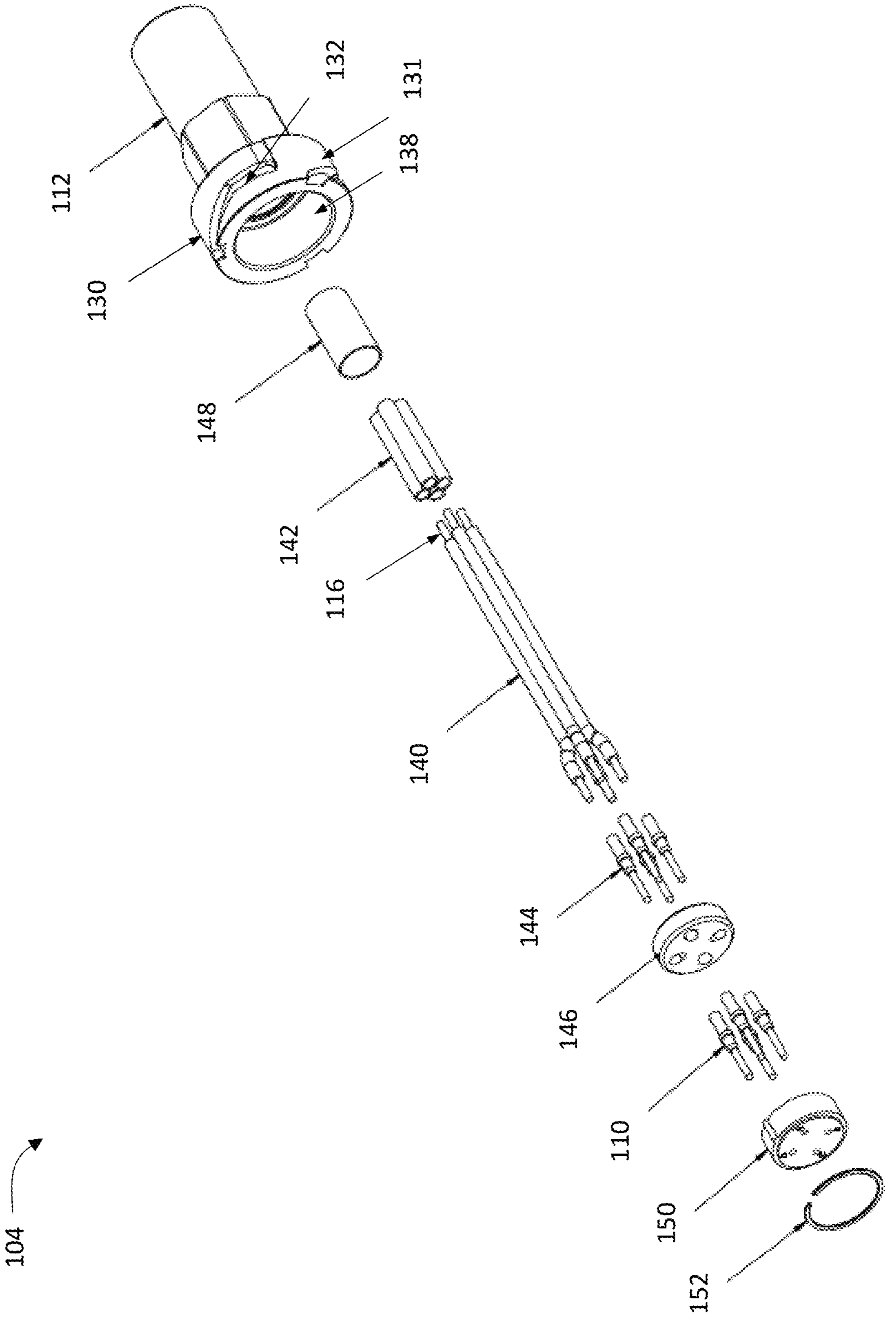
FIG. 2 shows an exploded view of a male pin assembly of the electrical connector suitable for implementing various embodiments of the disclosure.
Figure 3:
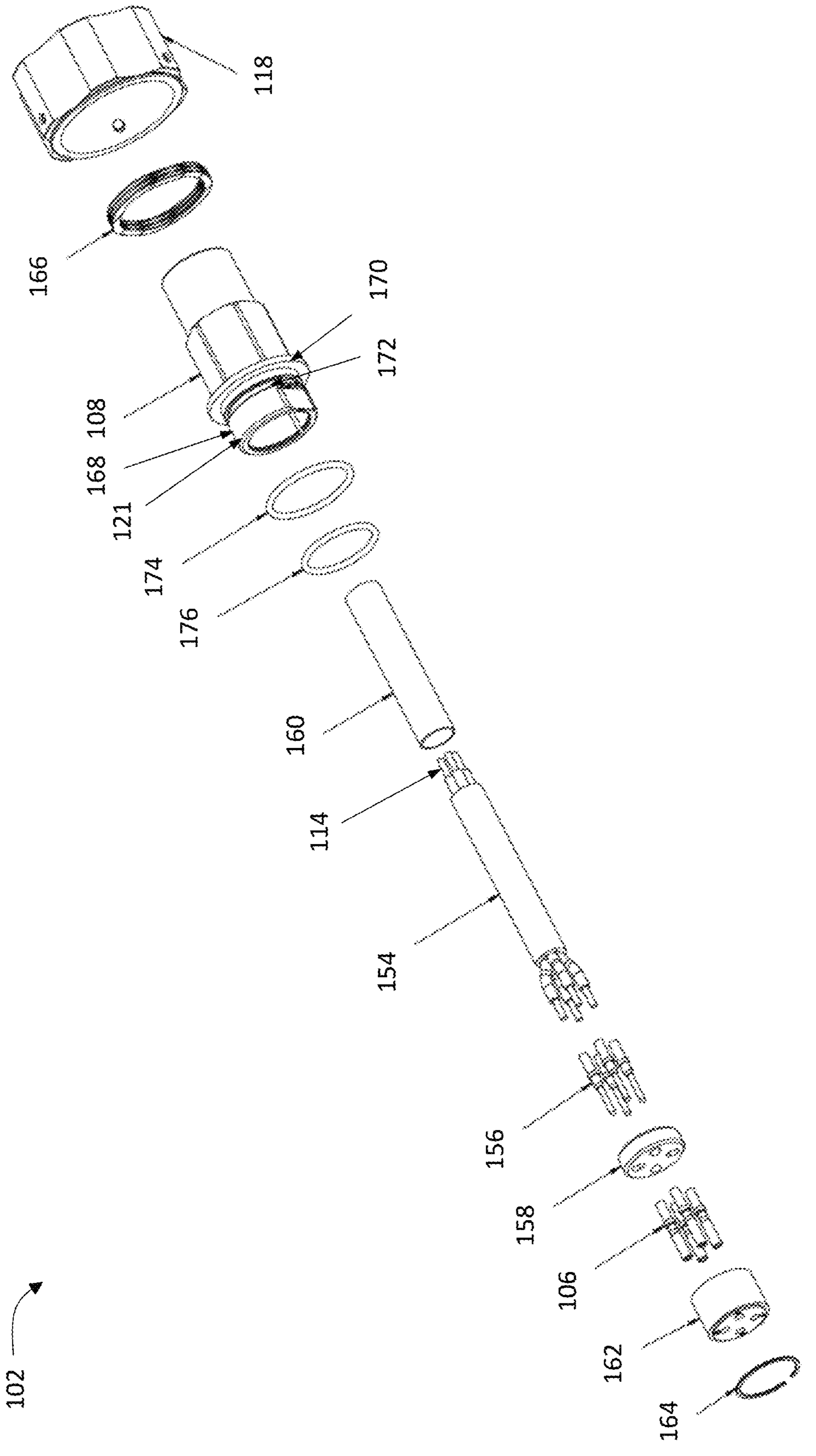
FIG. 3 shows an exploded view of a female socket assembly of the electrical connector suitable for implementing various embodiments of the disclosure.
Figure 4:
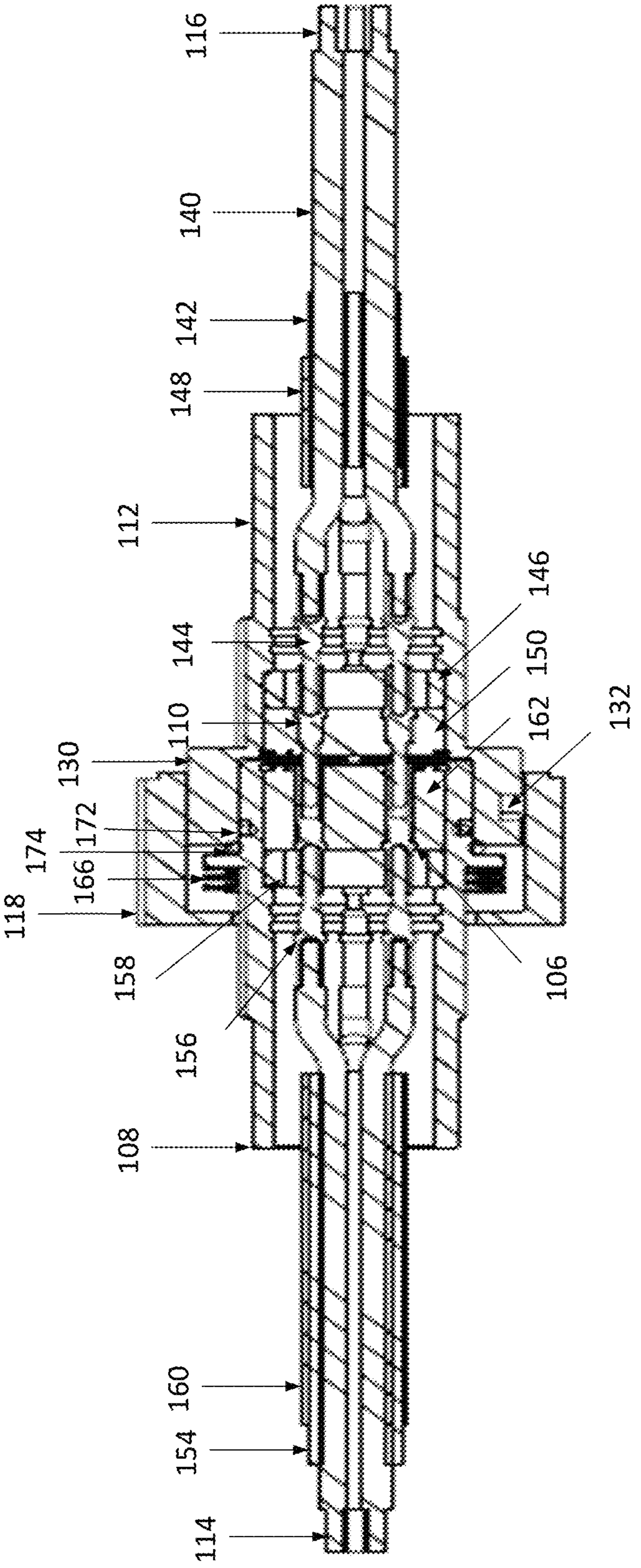
FIG. 4 shows a cross-sectional view of the electrical connector with the female socket assembly attached to the male pin assembly suitable for implementing various embodiments of the disclosure.

FIGS. 1-4 show an exemplary electrical connector 100 suitable for implementing various embodiments of the disclosure. The electrical connector 100 includes a female socket assembly 102 and a male pin assembly 104. An exploded view of the male pin assembly 104 is shown in FIG. 2. An exploded view of the female socket assembly 102 is shown in FIG. 3. A cross-sectional view of the electrical connector 100 with the female socket assembly 102 attached to the male pin assembly 104 is shown in FIG. 4.

The female socket assembly 102 includes a plurality of sockets 106 within a female connector housing 108. The plurality of sockets 106 are adapted to receives a corresponding plurality of connector pins 110 (best shown in FIG. 2) within a male connector housing 112 of the male pin assembly 104. In some implementations, the female connector housing 108 and the male connector housing 112 are made of 17-4 PH stainless steel. The sockets 106 are electrically coupled to a corresponding plurality of wires 114 which in turn may be coupled to other equipment, sensors, or conductors as needed. Likewise, the plurality of connector pins 110 of the male pin assembly 104 are electrically coupled to a corresponding plurality of wires 116 which in turn may also be coupled to other equipment, sensors, or conductors as needed. The electrical connector 100 provides electrical communication between the wires 114 and the wires 116 when the female socket assembly 102 and the male pin assembly 104 are connected together.

To facilitate connecting the female socket assembly 102 and the male pin assembly 104 together, the female socket assembly 102 includes a locking ring 118 that defines an interior connector space 120. The interior connector space 120 is defined between an interior surface 119 along an inner diameter of the locking ring 118 and an outside surface 121 along an outer diameter of the female connector housing 108. A plurality of pins 122 protrude from the interior surface 119 of the locking ring 118 into the interior connector space 120. In some implementations, the pins 122 are made of NITRONIC 60 stainless steel. Other non-galling stainless steels may be used. The pins 122 may be attached to the locking ring 118 via corresponding insert holes 124. The pins 122 act as cam followers as described in more detail below.

The outside diameter of the locking ring 118 defines an irregular surface of a repeating pattern of a plane 126 followed by a concave curve 128 that facilitates adequate purchase with gloved or bare hands. Additionally, the concave curves 128 allow for positive lockup of a standard adjustable wrench without the concern of crushing or damaging the locking ring 118. The locking ring 118 is attached to the female connector housing 108 to allow for rotation of the locking ring 118 with respect to the female connector housing 108.

The male connector housing 112 includes an engagement head 130. The engagement head 130 has an outside surface 131 along an outside diameter of the engagement head 130. The outside surface 131 corresponds with the interior surface 119 of the locking ring 118. In some implementations, the outside surface 131 of the engagement head 130 and the inside surface 119 of the locking ring 118 have a frictional fit. In some implementations, the outside diameter of the engagement head 130 is less than the inside diameter of the locking ring 118 such that the outside surface 131 of the engagement head 130 fits within the inside surface 119 of the locking ring 118 for sliding contact or without contact therebetween.

The engagement head 130 of the male connector housing 112 has an interior surface 138 along an inner diameter of the engagement head 130. The interior surface 138 corresponds with the outside surface 121 of the female connector housing 108. In some implementations, the interior surface 138 of the engagement head 130 and the outside surface 121 of the female connector housing 108 have a frictional fit. In some implementations, the inner diameter of the engagement head 130 is less than the outer diameter of the female connector housing 108 such that the interior surface 138 of the engagement head 130 fits around the outside surface 121 of the female connector housing 108 for sliding contact or without contact therebetween.

The engagement head 130 includes a plurality of cams 132 cut into the outside surface 131 of the engagement head 130. Each of the cams 132 is sized to receive a corresponding one of the pins 122 of the locking ring 118. Each of the cams 132 include an angled surface 134 and a pin seat 136.

When connecting the female socket assembly 102 to the male pin assembly 104, the pins 122 of the locking ring 118 engage with the cams 132 of the male connector housing 112. As the locking ring 118 is rotated about the female connector housing 108, the pins 122 follow the angled surface 134 of the cams 132 and drawn the male connector housing 112 toward and into engagement with the female connector housing 108. The pins 122 continue to follow the cams 132 until reaching the pin seats 136. The pin seats 136 lock the pins 122 in place with spring forces between the female connector housing 108 and the male connector housing 112. When the pins 122 are in the pin seats 136, the interior surface 138 of the engagement head 130 fits around the outside surface 121 of the female connector housing 108, such as shown in FIG. 4. A groove 137 in the engagement head 130 about the pin seats 136 provides a visual indicator that the pins 122 are positioned within the pin seats 136.

Likewise, when disconnecting the female socket assembly 102 from the male pin assembly 104, the locking ring 118 is rotated about the female connector housing 108. Sufficient force may need to be applied to the locking ring 118 to overcome the spring forces holding the pins 122 in the pin seats 136. Upon the pins 122 being unseated from the pin seats 136, the pins 122 follow the cams 132 as the locking ring 118 continues to rotate. As the pins 122 follow the angled surface 134 of the cams, the male connector housing 112 is pushed away from the female connector housing 108. The female socket assembly 102 is disconnected from the male pin assembly 104 responsive to the pins 122 being removed from the cams 132.

As shown in FIG. 2, the wires 116 of the male pin assembly 104 may form a bundle of individual insulated wires 140. In some implementations, the individual insulated wires 140 may each be FIREWALL SIS wires. The insulated wires 140 may be held in place by a heat shrink tubing 142 to ensure that the wires 140 are not displaced with respect to one another in the male pin assembly 104. Each of the wires 140 is connected to a female end of a corresponding one of a first set of connector pins 144. In some implementations, the connector pins 144 are MIL-STD connector pins. A male side of the connector pins 144 extend through corresponding holes in an insulator backing 146. In assembly, connector pins 144 may be affixed to the insulator backing 146 and the wires 140 with a first potting compound (not shown). Additionally or alternatively, a second heat shrink tubing 148 is placed over the connector pins 144 and the wires 140 at the point of connection therebetween.

The male side of the connector pins 144 engage with a female side of the connector pins 110. The male side of the connector pins 110 extend through corresponding holes in a pin insulator 150. In assembly, connector pins 110 may be affixed to the pin insulator 150 and the connector pins 144 with a second potting compound (not shown). The first potting compound may be the same or different than the second potting compound. The insulator backing 146 and the pin insulator 150 may each be made of polyetheretherketone (PEEK). The insulator backing 146 and the pin insulator 150 insulate the connector pins 110, 144. A retaining ring 152 holds the components of the male pin assembly 104 within the male connector housing 112.

As shown in FIG. 3, the wires 114 of the female connector housing 102 are provided in an insulated cable bundle 154 of insulated wires. In some implementations, the cable bundle 154 is a FIREWALL III cable. Each of the wires of the cable bundle 154 is connected to a female end of a corresponding one of a second set of connector pins 156. In some implementations, the connector pins 156 are MIL-STD connector pins. A male side of the connector pins 156 extend through corresponding holes in an insulator backing 158. In assembly, connector pins 156 may be affixed to the insulator backing 158 and the wires of the cable bundle 154 with a third potting compound (not shown). Additionally or alternatively, a third heat shrink tubing 160 is placed over the connector pins 156 and the wires from the cable bundle 154 at the point of connection therebetween.

The male side of the connector pins 156 engage with a first female side of the connector sockets 106. A second female side of the connector sockets 106 extend through corresponding holes in a socket insulator 162. In assembly, connector sockets 106 may be affixed to the socket insulator 162 and the connector pins 156 with a fourth potting compound (not shown). The third potting compound may be the same or different than the fourth potting compound. The insulator backing 158 and the socket insulator 162 may each be made of polyetheretherketone (PEEK). The insulator backing 158 and the socket insulator 162 insulate the connector sockets 106 and the connector pins 158. A retaining ring 164 holds the components of the female socket assembly 102 within the female connector housing 108.

The female socket assembly 102 also includes a spring 166 positioned between the female connector housing 108 and the locking ring 118. The spring 166 is configured to bias the female connector housing 108 towards the male connector housing 112 when the female socket assembly 102 and the male pin assembly 104 are connected together, as discussed above. The spring 166 may be a wave spring, a leaf spring, or any other suitable spring.

The female connector housing 108 includes an engagement head 168 with a flange 170 and an annular groove 172. A primary gasket 174 is sized to fit around the engagement head 168 and abut with the flange 170. A secondary gasket 176 is sized to fit within the annular groove 172. Providing a dual seal with the primary gasket 174 and the secondary gasket 176 on the female connector housing 108 improves protection of the electrical connection from ingress of water, heat, radiation, and super-heated steam. In some implementations, the primary gasket 174 and the secondary gasket 176 may be made of the same materials.

In some implementations, the primary gasket 174 is an O-ring made of ethylene propylene diene monomer (EPDM) and the secondary gasket 176 is an O-ring made of silicone. Using EPDM as the primary gasket 174 provides for steam and fluid resistance but it takes more of a set due to temperature and radiation. Therefore, as described in more detail below, the primary gasket 174 is backed by a spring, such as spring 166. The EPDM in the primary gasket 174 shields the silicone in the secondary gasket 176 from exposure to steam and fluid which the silicone is less able to resist. However, silicone takes less of a compression set due to radiation and heat and is therefore well suited for providing a secondary seal through placement in the groove 172, which does not change greatly over time or temperature.

As best shown in FIG. 4, when the female socket assembly 102 is connected to the male pin assembly 112, the primary gasket 174 is compressed by the spring 166 against the flange 170 and a front face of the engagement head 130 of the male connector housing 112. The compression applied against the primary gasket 174 allows for constant pressure on the primary gasket 174 even as the primary gasket 174 takes a set from the compression. The secondary gasket 176 takes less compression set and is contained within the groove 172 and controlled by stationary surfaces. Accordingly, the female socket assembly 102 has a dual seal on two different surfaces to prevent impingement of the surrounding environment into the electrical connector 100 when connected to the male pin assembly 104.

While the female connector housing 108 and male connector housing 112 are described above as such, it is contemplated by this disclosure that the connector pins 110 and connector sockets 106 may be swapped so that the connector housing 108 is a male connector housing and the connector housing 112 is a female connector housing. Other similar variations are likewise readily apparent.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electrical connector, comprising:

a first connector housing comprising a first engagement head, the first engagement head includes a flange and an outside surface with an annular groove thereon;

a first gasket sized to fit around the outside surface of the first engagement head and abut with the flange;

a second gasket sized to fit within the annular groove of the first engagement head; and a second connector housing comprising a second engagement head, the second engagement head includes a front face and an interior surface sized to fit around the outside surface of the first engagement head, wherein the first gasket and the second gasket are made of different materials, where the first gasket is made of ethylene propylene diene monomer adapted to provide fluid and super-heated steam resistance and the second gasket is made of silicone adapted to provide radiation and heat resistance such that the electrical connector is protected from ingress of water, heat, radiation, and super-heated steam, wherein the first connector housing and the second connector housing are configured to connect together such that the front face of the second engagement head compresses the first gasket against the flange of the first engagement head to form a first seal.

2. The electrical connector of claim 1, wherein the second engagement head includes an outside surface with a plurality of cams cut therein.

3. The electrical connector of claim 2, wherein the first connector housing further comprises a locking ring with an interior surface and a plurality of pins protruding from the interior surface.

4. The electrical connector of claim 3, wherein each of the plurality of cams is sized to receive a corresponding one of the plurality of pins.

5. The electrical connector of claim 4, wherein the plurality of cams each comprise an angled surface.

6. The electrical connector of claim 5, wherein the locking ring is configured to rotate about the first connector housing.

7. The electrical connector of claim 6, wherein the first connector housing and the second connector housing are configured to connect together such that as the locking ring is rotated, the plurality of pins follow the plurality of cams such that the angle surface causes the second connector housing to be drawn toward the first connector housing.

8. The electrical connector of claim 3, wherein the locking ring comprises an outside irregular surface of a repeating pattern of a plane followed by a concave curve.

9. The electrical connector of claim 3, wherein the first connector housing also includes a spring positioned between the locking ring and the flange.

10. The electrical connector of claim 1, wherein the second connector housing is a male connector housing with one or more connector pins.

11. The electrical connector of claim 10, wherein the second connector housing further comprises a pin insulator.

12. The electrical connector of claim 10, wherein the first connector housing is a female connector with one or more sockets configured to receive the one or more connector pins for electrical communication therebetween.

13. The electrical connector of claim 12, wherein the first connector housing further comprises a socket insulator.

14. An electrical connector, comprising:

a first connector housing comprising a first engagement head, the first engagement head includes a flange and an outside surface with an annular groove thereon;

a first gasket sized to fit around the outside surface of the first engagement head and abut with the flange;

a second gasket sized to fit within the annular groove of the first engagement head; and a second connector housing comprising a second engagement head, the second engagement head includes a front face and an interior surface sized to fit around the outside surface of the first engagement head, wherein the first gasket and the second gasket are made of different materials, where the first gasket is made of ethylene propylene diene monomer and the second gasket is made of silicone, wherein the first connector housing and the second connector housing are configured to connect together such that the front face of the second engagement head compresses the first gasket against the flange of the first engagement head to form a first seal, wherein the first connector housing and the second connector housing are configured to connect together such that second gasket forms a second seal between the outside surface of the first engagement head and the interior surface of the second engagement head wherein the first seal and the second seal form a dual seal on two different surfaces to prevent ingress of water, heat, radiation, and super-heated steam from a surrounding environment into the electrical connector.

15. An electrical connector, comprising:

a first connector assembly comprising a first retaining ring and a first connector housing with a first engagement head, the first engagement head includes a flange and an outside surface with an annular groove thereon, the first retaining ring holds components of the first connector assembly within the first connector housing;

a first gasket sized to fit around the outside surface of the first engagement head and abut with the flange; and a second gasket sized to fit within the annular groove of the first engagement head, wherein the first gasket and the second gasket are made of different materials to form a dual seal on two different surfaces of the electrical connector to prevent ingress of water, heat, radiation, and super-heated steam from a surrounding environment into the electrical connector, wherein the flange is one of the two different surfaces that form the dual seal, and wherein an interior surface sized to fit around the outside surface of the first engagement head is another of the two difference surfaces that form the dual seal.

16. The electrical connector of claim 15, further comprising:

a second connector assembly comprising a second retaining ring and a second connector housing comprising a second engagement head, the second engagement head includes a front face and the interior surface sized to fit around the outside surface of the first engagement head, the second retaining ring holds components of the second connector assembly within the second connector housing.

17. The electrical connector of claim 16, wherein the components of the first connector assembly include a first insulator.

18. The electrical connector of claim 16, wherein the components of the second connector assembly include a second insulator.

19. The electrical connector of claim 18, wherein the components of the first connector assembly further include a first insulator backer, and wherein the components of the second connector assembly further include a second insulator backer.

* * * * *